United States Patent

[11] 3,623,567

[72] Inventor Ian McKenzie, Etobicoke, Canada
[21] Appl. No. 869,651
[22] Filed Oct. 27, 1969
[45] Patented Nov. 30, 1971
[73] Assignees Canadian International Paper Company; Quebec North Shore Paper Company Montreal, Quebec; Abitibi St. Anne Paper Ltd., Beaupre, Quebec, Canada, part interest to each

[54] COUPLING FOR ARTICULATED VEHICLE INCORPORATING STABILIZER
6 Claims, 5 Drawing Figs.
[52] U.S. Cl. ................................................ 180/14 R, 180/79.2 B, 280/492
[51] Int. Cl. ........................................................ B60d 1/00
[50] Field of Search ............................................. 180/79.2 B, 51, 52, 14; 280/492, 483, 484, 485

[56] References Cited
UNITED STATES PATENTS
| | | | |
|---|---|---|---|
| 3,169,783 | 2/1965 | Harbers | 280/485 |
| 3,498,488 | 3/1970 | Widley | 280/483 X |
| 3,515,407 | 6/1970 | Zimmerman | 180/14 X |

FOREIGN PATENTS
| | | | |
|---|---|---|---|
| 604,394 | 10/1934 | Germany | 280/492 |

Primary Examiner—Benjamin Hersh
Assistant Examiner—John A. Pekar
Attorney—Jacobi, Lilling & Siegel ABSTRACT: An articulated vehicle having a front and rear chassis interconnected by a coupling which permits movement of the chassis relative to one another about each of a vertical and horizontal axis and spring means interposed between members of the coupling, to resist movement of one chassis relative to the other chassis about a horizontal axis. The coupling for interconnecting the chasses consists of internested inner and outer shell-like housing members having adjacent correspondingly mating surfaces substantially rectangular in cross-sectional view transverse to the length of the vehicle, the adjacent surfaces being provided with enlargements and depressions correspondingly oriented and having a spring material interposed between the members in the space between the enlargements and depressions. The spring member is an elastomeric material and the depressions and enlargements have correspondingly adjacent arcuate outer faces which bear against the elastomeric material.

COUPLING FOR ARTICULATED VEHICLE INCORPORATING STABILIZER

This invention relates to an improved coupling interconnecting the chassis of an articulated vehicle.

Articulated vehicles are known which have the chassis interconnected by a coupling permitting both roll and turning of the chassis relative to one another. The coupling between the chassis allows for pivotal movement of one chassis relative to the other about a vertical axis and also about a horizontal axis. The latter pivotal movement is what is commonly referred to as roll.

The present invention concerns stabilizing movement of the chassis relative to one another by incorporating a stabilizer in the chassis coupling.

It will be readily apparent that if one chassis is allowed to roll relative to the other, only one of the two vehicle ground supports resist overturning forces, that is, forces tending to upset the vehicle to one side or the other. Tipping forces in the past have not been of any great concern because of most vehicles having a relatively low center of gravity. Recent developments, however, in mechanizing logging have resulted in vehicles being provided with substantial heavy mechanical equipment such as felling heads, extendible-retractable booms, and the like, raising the center of gravity. One such vehicle is disclosed in applicant's copending Canadian application Ser. No. 979,734 filed Jan. 7, 1967 now Canadian Pat. No. 837,395 which discloses an articulated self-propelled vehicle having a knuckle boom pivotally attached thereto with a felling head mounted on the free end of the boom. The felling head consists of a grapple and shear for felling standing trees and loading the same onto a bunk attached to the vehicle. The boom has a relatively large reach and it will be readily apparent lifting trees at full reach of the boom places large twisting and tilting forces on the vehicle. Overturning moments are even more acute when swaying of the vehicle and its superstructure occurs from movement of the vehicle. Moments such as these cannot be readily counteracted by repositioning the boom as is possible during the loading operation.

Another stabilizing problem common to all large wheeled vehicles of the present type concerns the gyroscopic effect from wheel inertia, i.e. the load acting in the plane of a rotating wheel, for example, the boom and felling head assembly pivoting about a vertical axis during loading operations. When the axis of such rotating wheels is changed, the inertia forces react on the vehicle chassis and contribute to instability.

In order to overcome these and other stability problems, it has been found desirable to add additional support means to such vehicles so as to restrict and thereby control movement of the vehicle chassis relative to one another.

In applicant's copending Canadian application Ser. No. 032,876 filed Oct. 10, 1968 and corresponding to U.S. Ser. No. 866,655 filed Oct. 15, 1969, there is disclosed a vehicle having a chassis supported in an unsprung manner and including means allowing roll of one portion of the vehicle relative to another portion about a generally horizontal axis each of which portions are supported on the ground by wheels, carriages or the like, the improvement comprising one or more stabilizers interposed between said relatively movable portions selectively resisting torsional movement of one said portion relative to the other said portion relative to the other said portion about said horizontal axis and thus providing forces resiting moments tending to overturn the vehicle. The chassis are supported by wheel assemblies at least one of which includes axle means having a pair of wheels mounted thereon in spaced relation relative to one another and which axle is pivotally connected to the chassis to permit roll. The stabilizers in the copending application comprise spring means interposed between the pivotally mounted axle and the chassis.

In accordance with the present invention there is provided, in a vehicle of the type having a first and second chassis pivotally interconnected one to the other in such a manner as to allow movement therebetween about each of a vertical and horizontal axis, said chassis each being supported by wheel assemblies or the like, the improvement comprising: spring means interposed between said first chassis and said second chassis resisting movement of one chassis relative to the other about said horizontal axis.

In accordance with a still further aspect of the present invention, there is provided a coupling for interconnecting a pair of chassis of an articulated vehicle, said coupling comprising, in a vehicle of the type having a first and second pair of chassis pivotally interconnected one to the other in such a manner as to allow movement therebetween about each of a horizontal axis and a vertical axis and wherein each of said chassis are supported on wheel assemblies or the like, the improvement comprising spring means interposed between said first and said second chassis resisting movement of one chassis relative to the other about said horizontal axis.

The invention is illustrated by way of example in the accompanying drawings wherein.

Figure 1:
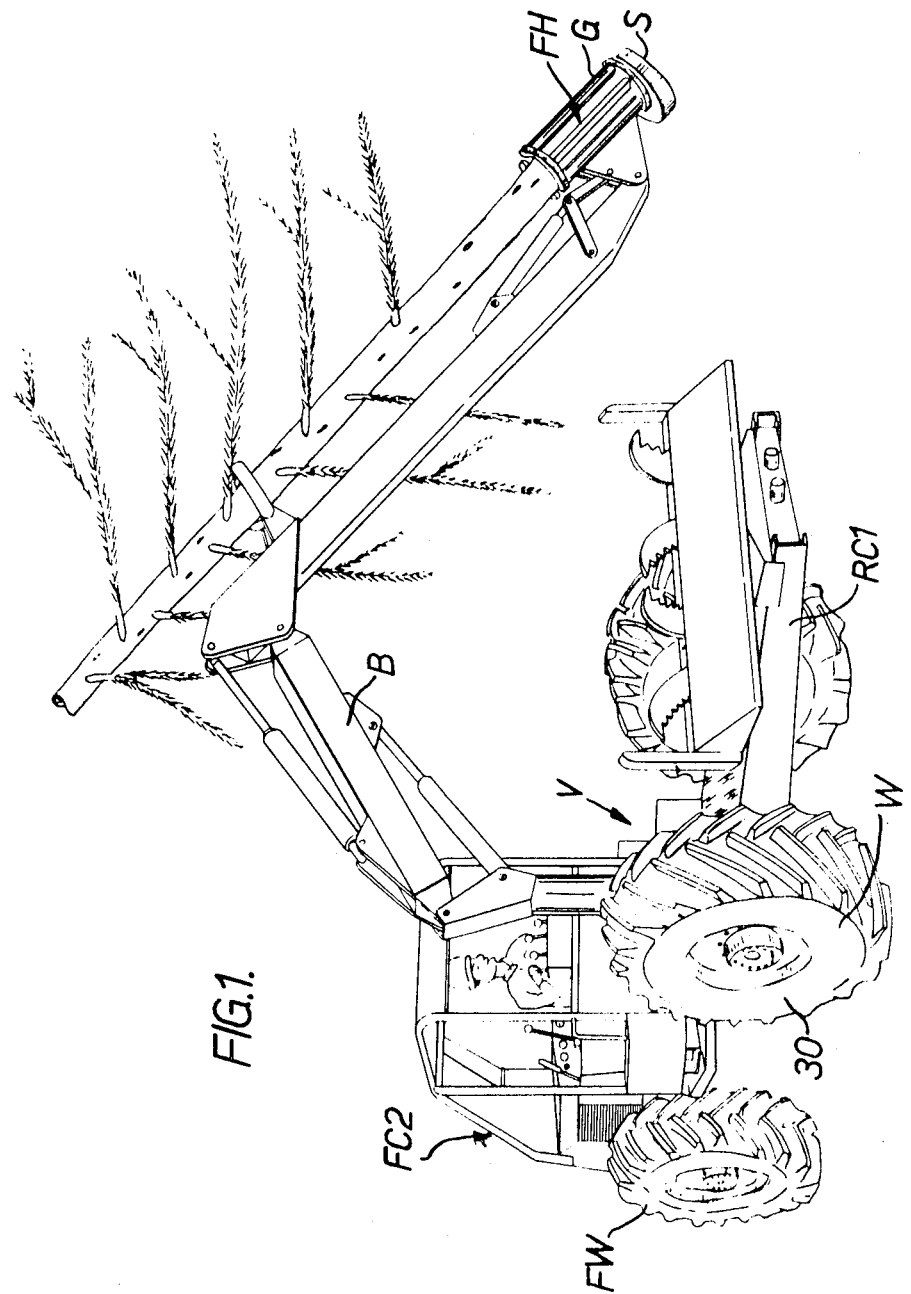
FIG. 1 is an oblique view of one type of logging vehicle incorporating the present invention.

Referring to the drawings, in FIG. 1 there is illustrated a log-handling vehicle which includes an extendible and retractable boom B pivotally mounted on a self-propelled vehicle V for swinging movement about a substantially vertical axis. A felling head FH is attached to the free end of the boom B and includes a tree-severing mechanism S attached to the lower end of a grapple G. The self-propelled vehicle V is of the type having a trailing chassis supported on rear wheels rigidly attached to the chassis and front wheels similarly connected to the front chassis with the coupling interconnecting the pair of chassis allowing for roll and turning of the chassis about, respectively, a horizontal and a vertical axis. In such type vehicle it will be readily apparent only the one set of wheels resist moments on that chassis tending to overturn the vehicle sideways.

The felling head FH is movable toward and away from the vehicle by respectively retracting and extending the boom B and thus with the boom at a full reach position and located to one side of the vehicle, large moments are applied to the vehicle tending to overturn the same.

In the vehicle illustrated in FIG. 1, a pair of rear drive wheels W are rigidly attached to a rear chassis RC1 pivotally connected to a front chassis FC2, also supported by a pair of drive wheels rigidly attached thereto, by a coupling as illustrated in FIGS. 2 and 3, or FIGS. 4 and 5. In accordance with the present invention, a stabilizer is located in the coupling and is thus interposed between the vehicle chassis RC1 and FC2 whereby all of the wheels contribute to maintain the vehicle in an upright position.

FIGS. 2 to 5 illustrate a coupling for interconnecting the front and rear chassis of an articulated vehicle where such coupling allows for roll of the vehicle chassis relative to one another. The axles, as mentioned, are rigidly attached to the respective chassis of the vehicle. If desired, however, one of the axles may be pivotally attached to the chassis associated therewith in which event additional stabilizers would be located between the axle and the chassis to which it is pivotally attached.

Figure 2:
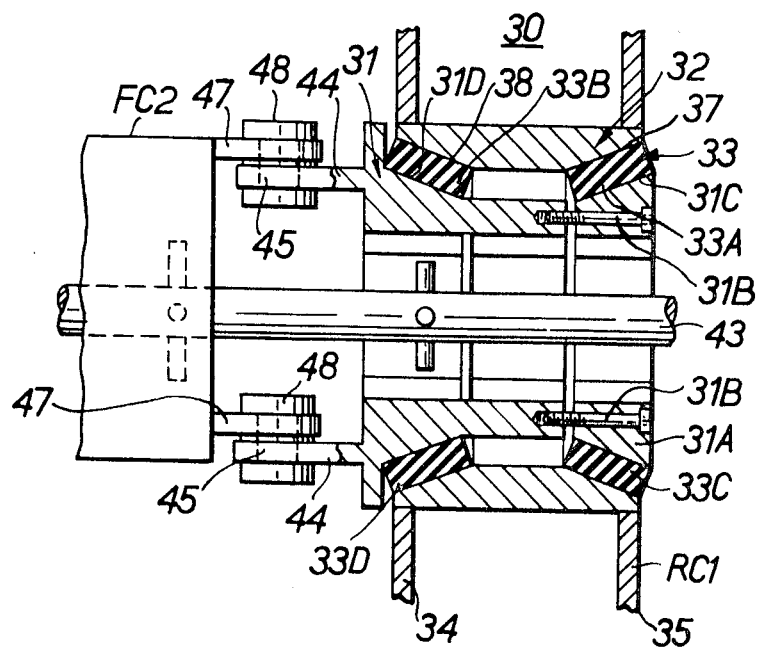
FIG. 2 is a fragmentary side view of an articulated vehicle having a pair of chassis interconnected in such a manner as to permit roll at such connection in accordance with the present invention, and also incorporating a stabilizer therein.
Figure 3:
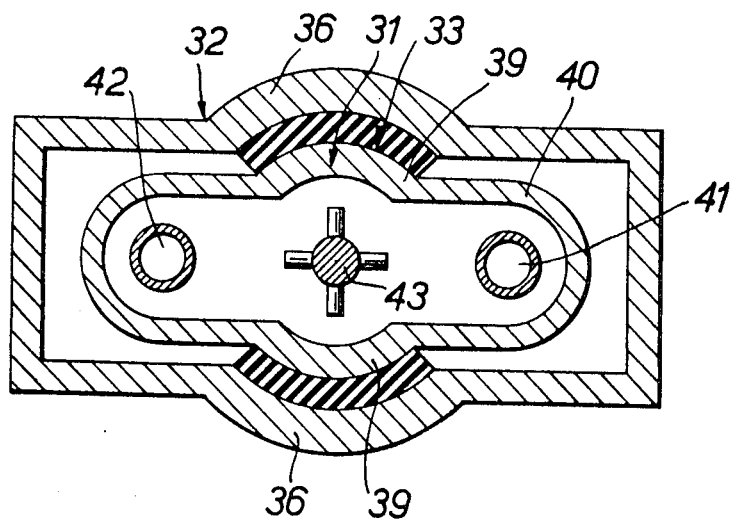
FIG. 3 is a part sectional plan view of the apparatus shown in FIG. 2.

Referring to FIGS. 2 and 3, there is illustrated a coupling assembly 30 for use in pivotally interconnecting the respective front and rear chassis FC2 and RC1 of the articulated vehicle illustrated in FIG. 1. The coupling 30 includes an inner housing 31 and an outer housing 32 disposed partially in concentric relation with respect to one another and having an elastomeric material 33 interposed therebetween. The outer housing 32 is rigidly secured to the frame of the rear chassis RC1 as, for example, being welded or bolted to flanges 34 and 35 of the frame. The outer housing 32 is preferably a substantially rectangular tubular housing in end elevational view (see FIG. 2), having a pair of opposed arcuate portions 36 providing an enlargement for receiving the inner housing 31. The inner surface of the arcuate portions may be chamfered as at 37 and 38 for receiving the resilient material.

The resilient material 33 provides a stabilizer resisting relative movement of the inner and outer housings 31 and 32, respectively, but is sufficiently resilient to permit roll of the chassis relative to one another about a horizontal axis. The resilient material 33 consists of four segmental sections 33A, 33B, 33C and 33D interposed between the sloped inner face of outer housing 32 and a similarly shaped outer face on the inner housing 31.

The inner housing 31, as illustrated in FIG. 3, is a shell or longitudinally extending sleeve having an upper and lower arcuate portion 39 corresponding to the arcuate inner surface of the respective upper and lower portions 36 on the outer housing 32. The inner housing 31 further includes a pair of outwardly directed enlarged lobe portions 40 for receiving respective ones of a pair of hydraulic cylinders 41 and 42 located one on each side of a drive shaft 43 extending through the central portion of the inner housing 31. The hydraulic cylinders 41 and 42 are each connected, respectively, to the front and rear chassis such that extension and retraction of the cylinders effects appropriate turning movement of one chassis relative to the other. The lobes or enlargements 40 also provide abutments or stops for engaging the outer housing 32 on each of a pair of opposite sides of the elastomeric material 33 limiting relative pivotal movement of the inner and outer housings 31 and 32 with respect to one another about an axis generally parallel to the length of the drive shaft. The stops thus limit the amount of roll. The drive shaft 43 accordingly passes through the coupling transmitting power from a motor located on the front chassis FC1 to a differential assembly or like gearing drivingly connected to the rear wheels. The hydraulic cylinders 41 and 42 are common units and are only diagrammatically illustrated in end view in FIG. 3.

The inner housing 31 has a pair of lugs 44 projecting laterally beyond the outer housing 32. The lugs 44 are each provided with an aperture 45 located in alignment with one another and with correspondingly aligned apertures in a pair of lugs 47 secured to the front chassis FC2. A pair of pins 48 pivotally interconnects respective ones of the adjacently disposed sets of lugs 44, 45 interconnecting the front and rear chassis. The hydraulic cylinders 41 and 42, being located one on each of opposite sides of the pivot axis of pins 48, selectively effects pivotal movement of one chassis relative to the other about such pins.

To facilitate assembling housing 31 in outer housing 32, the inner housing 31 has a cap portion 31A detachably secured thereto by a plurality of of studs 31B. The cap 31B has a sloped outer face 31C corresponding to the inner sloped face 37 of outer housing 32. Similarly, housing 31 has a sloped face or bearing surface 31D facing the sloped surface 38 on the outer housing. Faces or bearing surfaces 31C and 31D slope inwardly toward one another in face-to-face relation and are disposed in spaced relation longitudinally of the vehicle. It will be readily apparent the sloped adjacent faces of inner and outer respective housings 31 and 32 position the elastomeric material such that it is responsive and reacts against forces tending to twist one housing relative to the other about an axis generally parallel to the drive shaft, i.e. roll, and also longitudinally displace one housing relative to the other along such axis. The elastomeric material 33 accordingly not only provides a stabilizer tending to resist roll but also serves as a resilient coupling interconnecting the front and rear chassis of the articulated vehicle.

Figure 4:
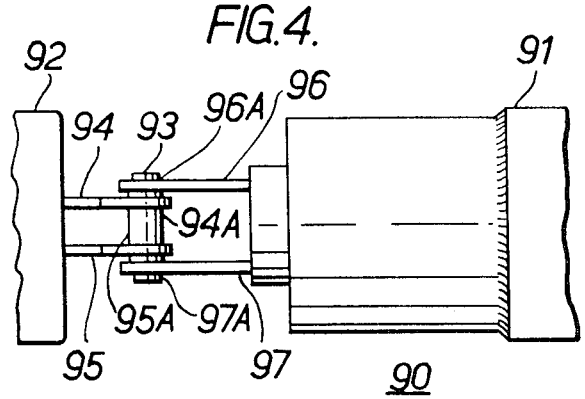
FIG. 4 is a side view similar to FIG. 2 illustrating a modified coupling incorporating stabilizing means.
Figure 5:
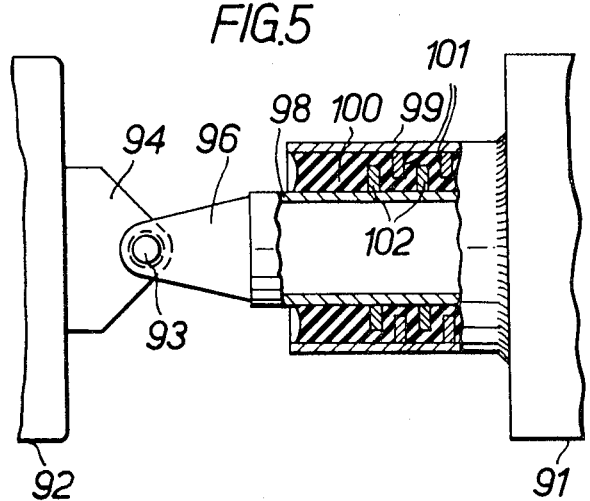
FIG. 5 is a right-hand end elevational view of FIG. 4.

Referring to FIGS. 4 and 5, there are illustrated fragmentary portions 91 and 92 of respective rear and front chassis RC1 and FC2 pivotally interconnected by a member which incorporates a stabilizing arrangement, generally designated by the reference numeral 90. The chassis portion 92 has a pair of bracket members 94 and 95 secured thereto and which include aligned apertures for receiving a pivot pin 93. The stabilizing arrangement 90 includes a pair of bracket members 96 and 97 having similarly aligned apertures for receiving the pin 93. Pin 93, accordingly, in passing through aligned apertures 94A, 95A, 96A and 97A in respective brackets 94, 95, 96 and 97 pivotally interconnect the vehicle chassis RC1 and FC2 for movement relative to one another about a generally vertical axis. This permits articulated movement of one chassis relative to the other as is well known in the art.

The brackets 96 and 97 are secured to a shaft member 98 concentrically disposed in a sleeve 99. Interposed between the shaft 98 and sleeve 99 is a tubular member 100 made of an elastomeric material such as rubber or the like. The elastomeric material 100 is secured to the respective members 98 and 99 to provide a resisting torsional force tending to restrain relative movement of members 98 and 99. As illustrated in FIG. 5, shaft 98 may, if desired, include one or more flanges 102 projecting outwardly therefrom in a direction toward the inner surface of sleeve 99. Similarly, one or more flanges 101 may be secured to the sleeve 99 and project inwardly toward the shaft 98. The flanges 101 and 102 may be disposed in nested relation as illustrated, and accordingly, increase the area contact of respective members 98 and 99 with the elastomeric material 100. Member 99 is rigidly secured to the vehicle chassis portion 91 and member 98 is similarly rigidly connected through pin 93 and bracket members to vehicle chassis portion 92. Pivotal movement of the chassis relative to one another about a horizontal axis, accordingly, is restrained by the member 100 normally biasing the chassis to a selected relative position with respect to one another. Members 98 and 99 are concentric with respect to one another and may be variously arranged, for example, the outer member 99 may be secured to lugs 96 with the inner member 98 being secured to the rear chassis 91.

In the stabilizer arrangement disclosed in the aforementioned copending application, compression springs are utilized to bias the chassis to a particular position and thus limit its movement. The compression springs are offset from the pivotal connection of the axle to the chassis. In the arrangement illustrated in FIGS. 2 to 5, the spring member restraining roll movement is a torsion spring and, accordingly, is located on the pivot axis. An arrangement, as illustrated in FIGS. 2 and 3 may be employed in a vehicle having axles pivotally mounted allowing roll in which case compression springs, located one on each side of the pivot pin, may be disposed of and a stabilizing member, as illustrated in FIGS. 4 and 5, utilized to pivotally interconnect the axle to the chassis associated therewith.

I claim:

1. A coupling for use in interconnecting a pair of vehicle chassis to provide an articulated vehicle comprising:
   a. an inner tubular housing defined by a peripheral wall, and including a pair of enlargements protruding therefrom in opposite directions relative to one another;
   b. an outer housing having an inner peripheral wall circumscribing said inner housing and including a pair of depressions in the inner peripheral wall thereof, said depressions being correspondingly oriented with respect to the enlargements of the inner housing and in overlying selected spaced relation with respect thereto;
   c. a spring member consisting of an elastomeric material interposed between said inner and outer housings in the spaces between the respective enlargements and depressions of the housings and in abutting relation with respect thereto; and
   d. means for pivotally connecting one or the other of said inner and outer housings to one of said pair of chassis and fixedly securing the other of said housings to the other one of said pair of chassis.

2. A coupling as defined in claim 1 wherein the respective enlargements and depressions associated with one another each include correspondingly shaped, oppositely directed sloping surfaces engaging the elastomeric material.

3. A coupling as defined in claim 1 wherein said inner and outer housings are each generally rectangular in cross section, tubular members having a pair of correspondingly oriented, internested enlargements therein and wherein said members directly engage one another on opposite sides of said enlargements providing stops limiting relative movement of one member with respect to the other.

4. A coupling as defined in claim 1 wherein the depressions and enlargements have corresponding arcuate adjacent surfaces.

5. A coupling for use in interconnecting a pair of vehicle chassis to provide an articulated vehicle comprising:
   a. an inner housing defined by a peripheral wall, a pair of enlargements in said wall spaced from one another and directed outwardly from said housing in opposite directions relative to one another, and means on said housing for pivotally connecting such housing to one of the pair of said vehicle chassis for movement about an axis transverse to said peripheral wall;
   b. an outer housing having an inner peripheral wall, circumscribing said inner housing and including a pair of oppositely directed depressions in said inner peripheral wall, correspondingly oriented with respect to said enlargements on said inner housing and in selected space relation with respect thereto; and
   c. a spring member consisting of an elastomeric material interposed between said inner and outer housings in abutting relation therewith and in the space between the enlargement and depression in the respective inner and outer housings.

6. An articulated vehicle comprising in combination:
   a. a first and second pair of chassis;
   b. power means on at least one of said chassis and drivingly connected to ground-engaging assemblies for said vehicle to propel the same; and
   c. a coupling interconnecting said pair of chassis for relative movement with respect to one another about each of a vertical axis and horizontal axis respectively to steer the vehicle and provide roll for the vehicle, said coupling comprising an inner and outer pair of internested housings having adjacent mating walls disposed in selected spaced relation with respect to one another, said walls being generally rectangular in cross section transverse to the length of the vehicle and having correspondingly oriented oppositely directed enlargements and depressions on the respective inner and outer housings, said inner housing comprising a tubular member having a passage extending therethrough for the driving connection between the power means and ground-engaging assemblies, and a spring member consisting of an elastomeric material interposed between said inner and outer housings in the spaces between the respective enlargements and depressions of the housings and in abutting relation with respect thereto.

* * * * *